United States Patent Office 3,521,749
Patented July 28, 1970

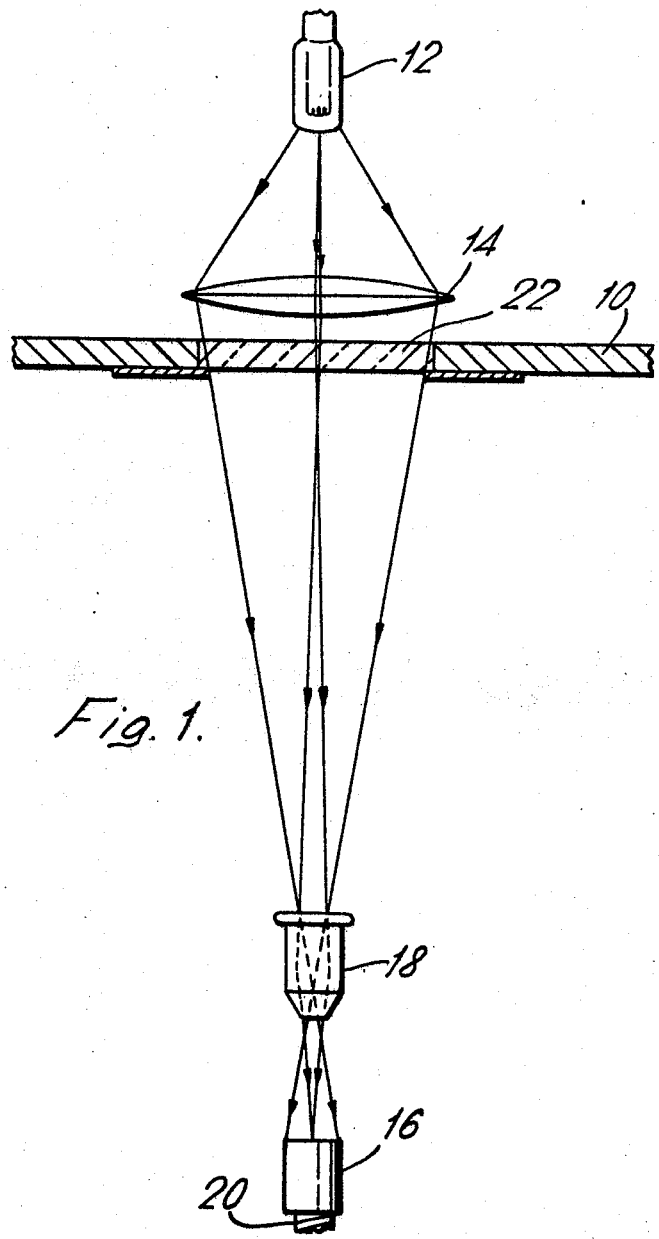

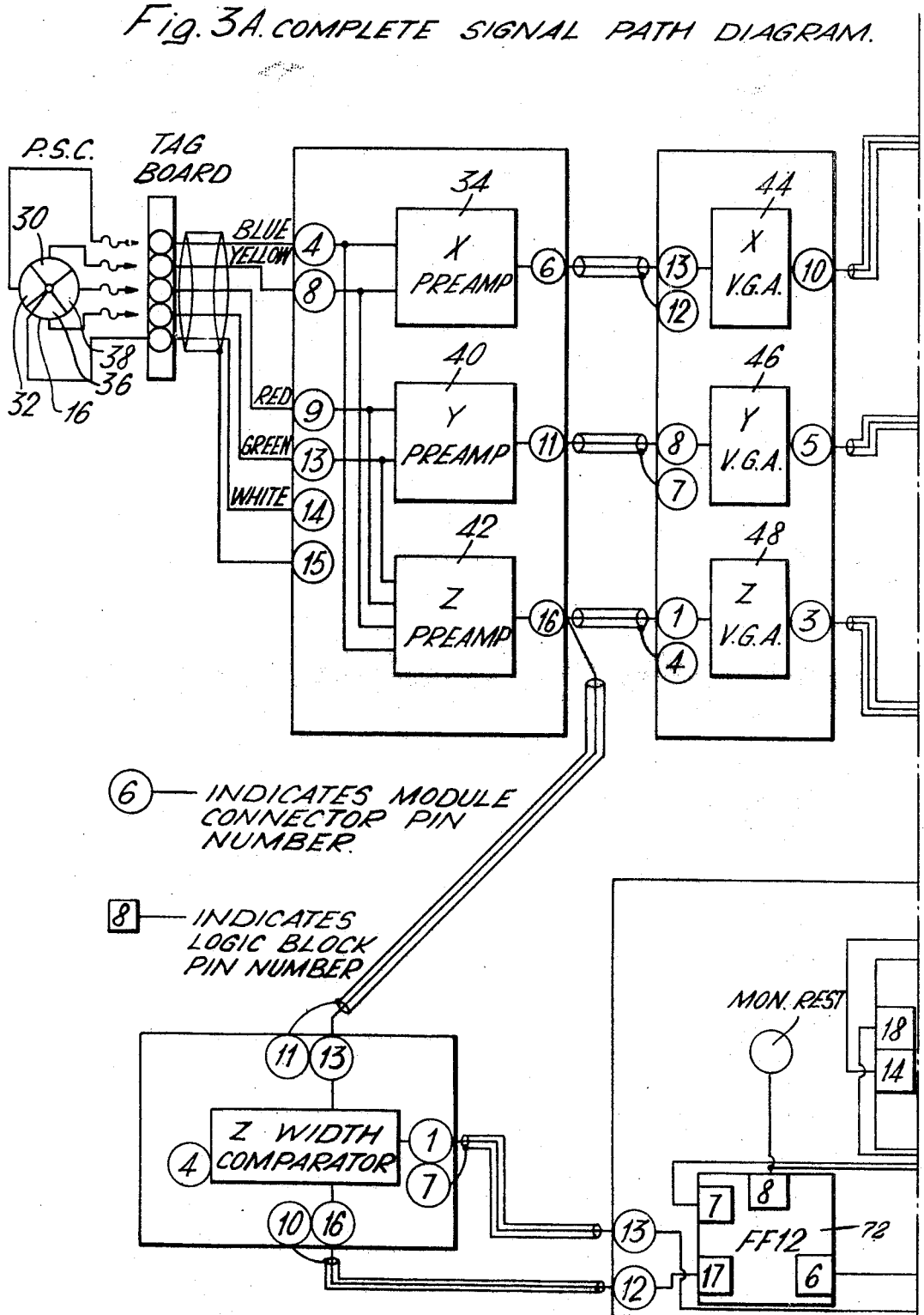

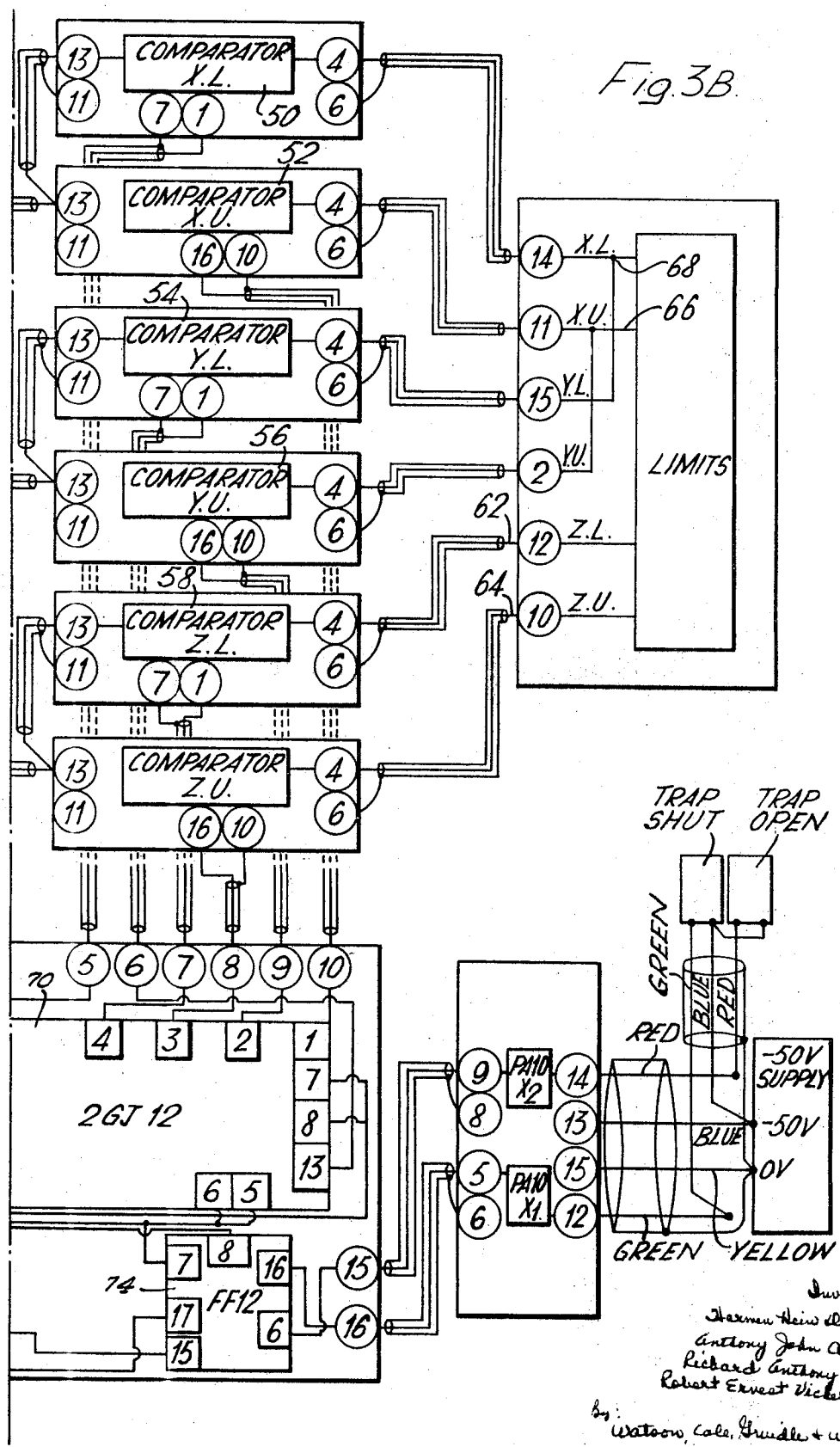

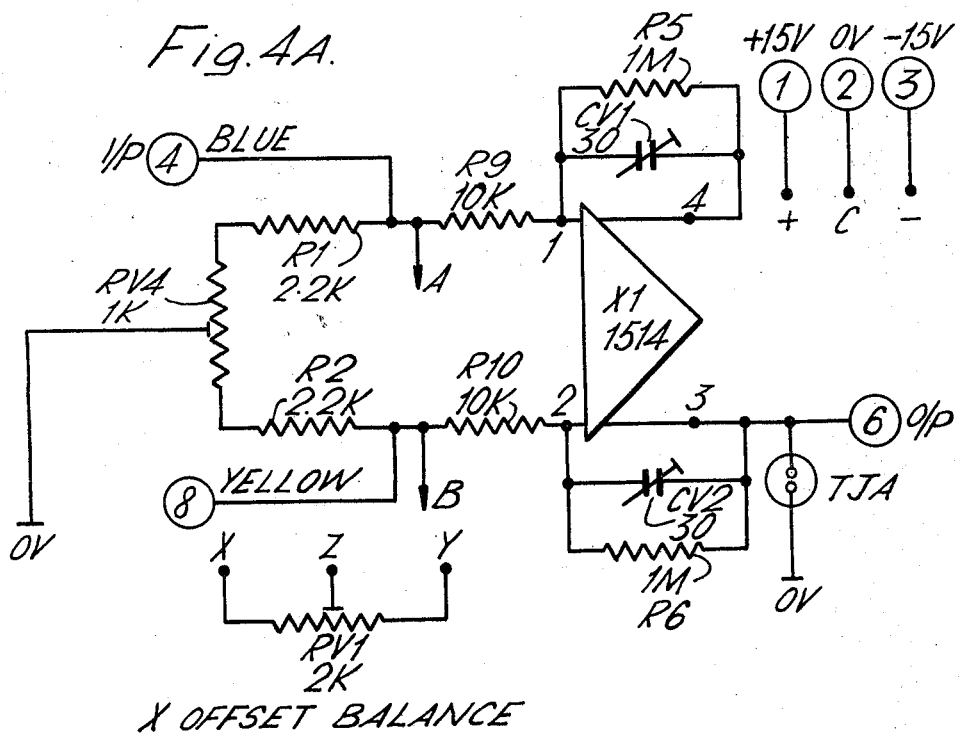
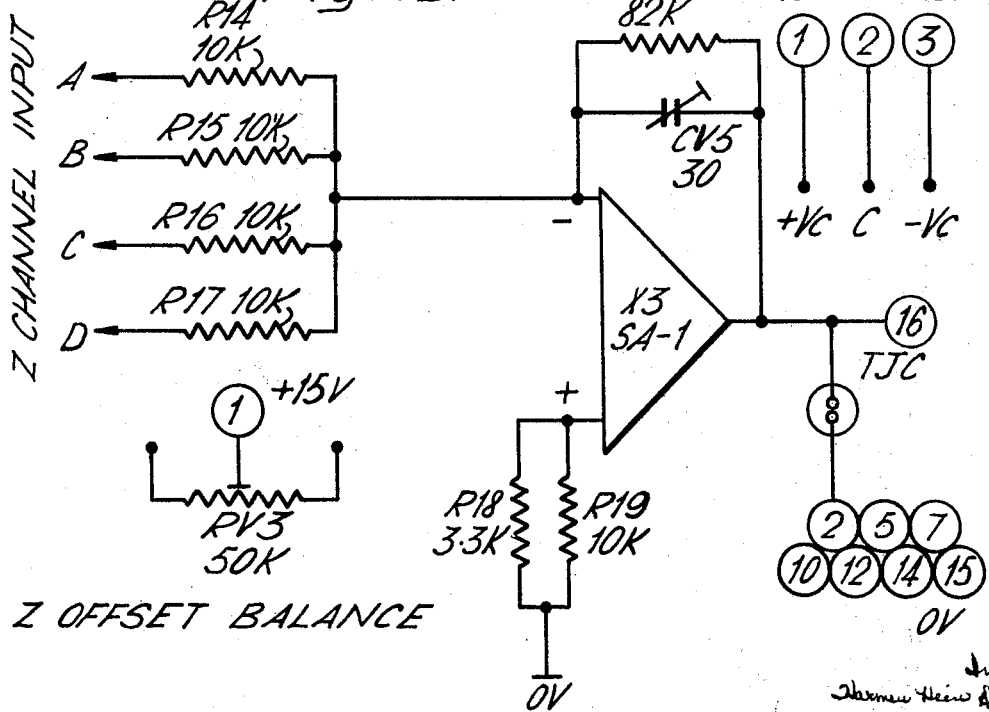

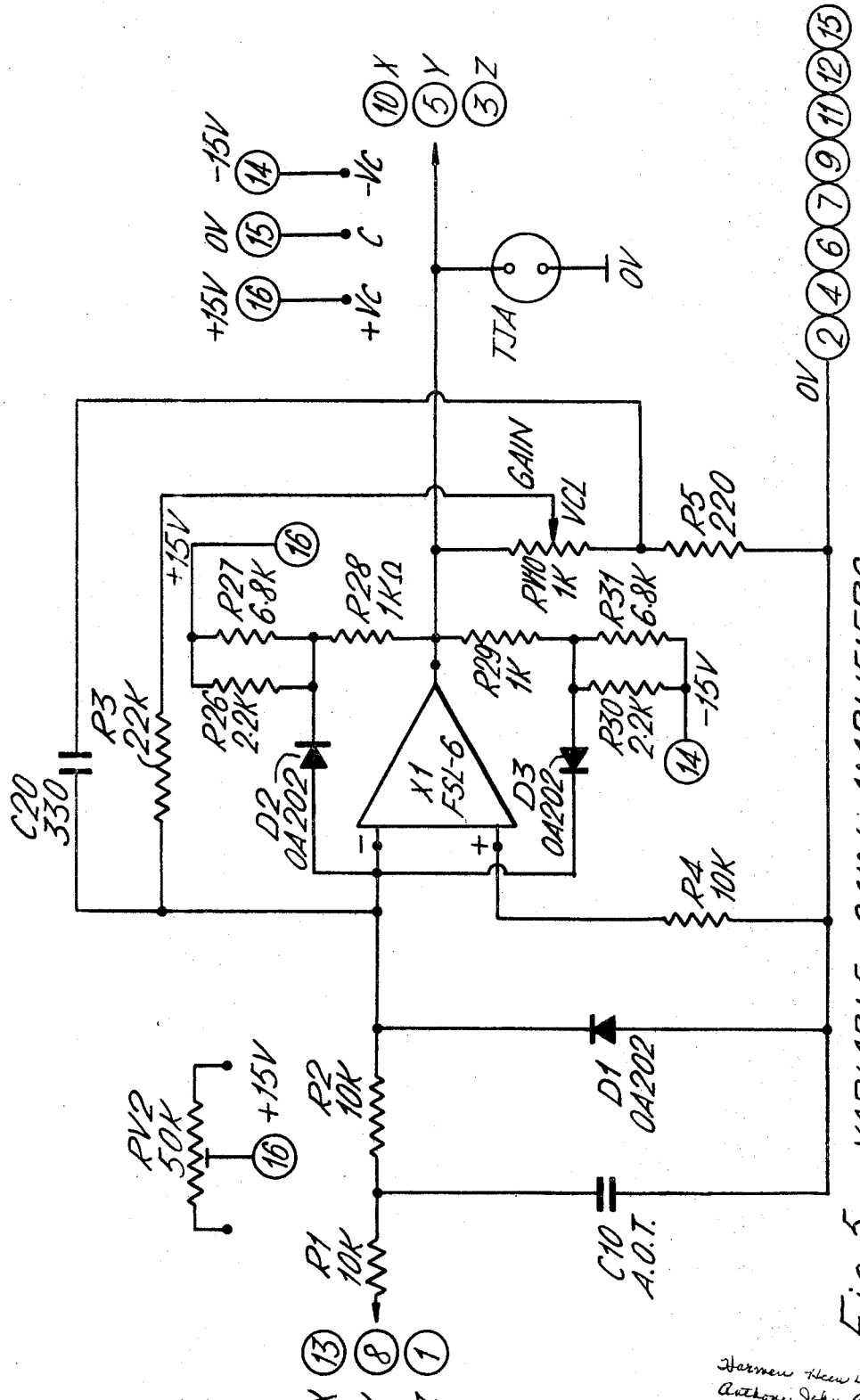
Fig. 5. VARIABLE GAIN AMPLIFIERS.

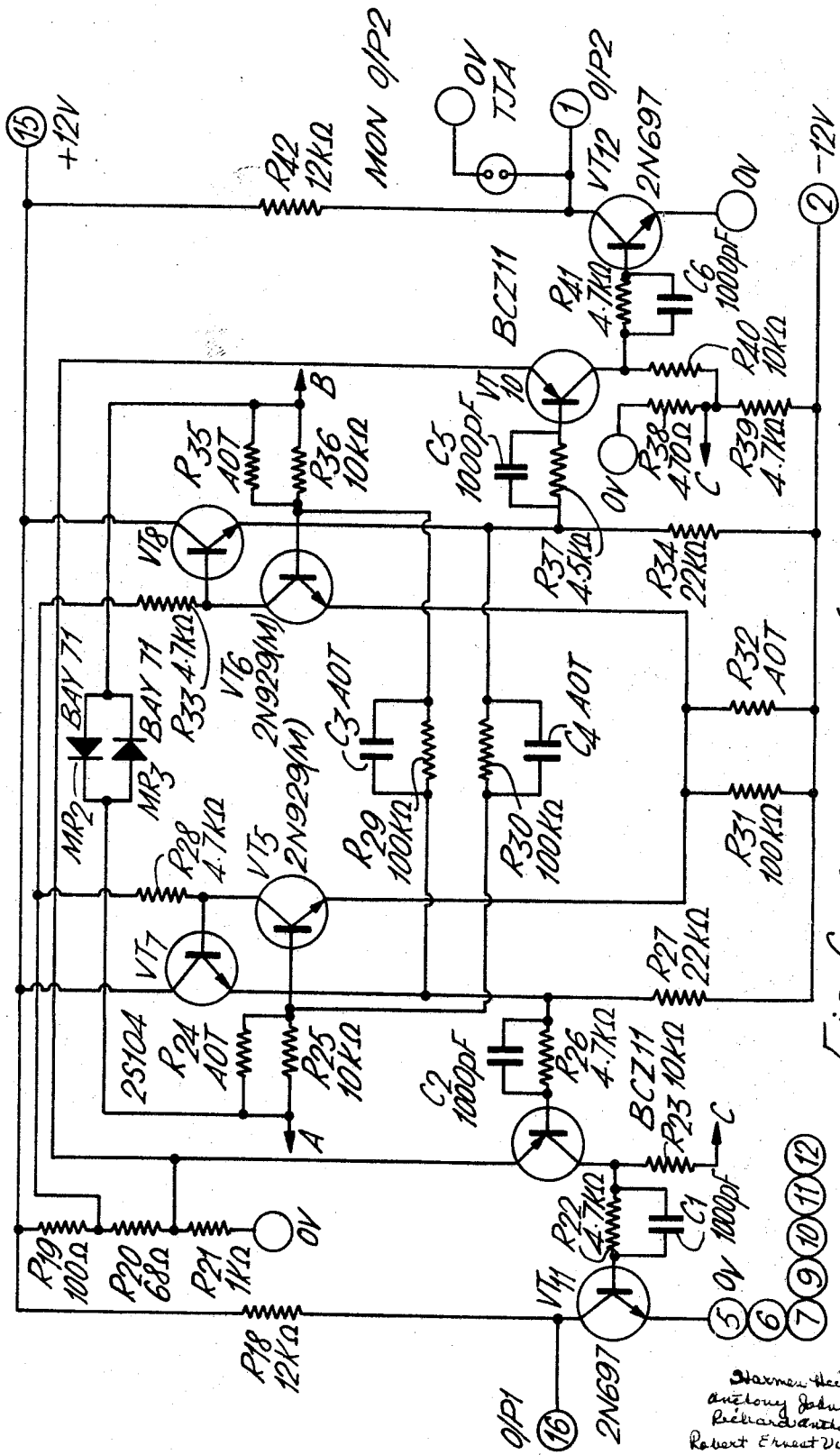
Fig. 6. COMPARATOR (TRIGGER)

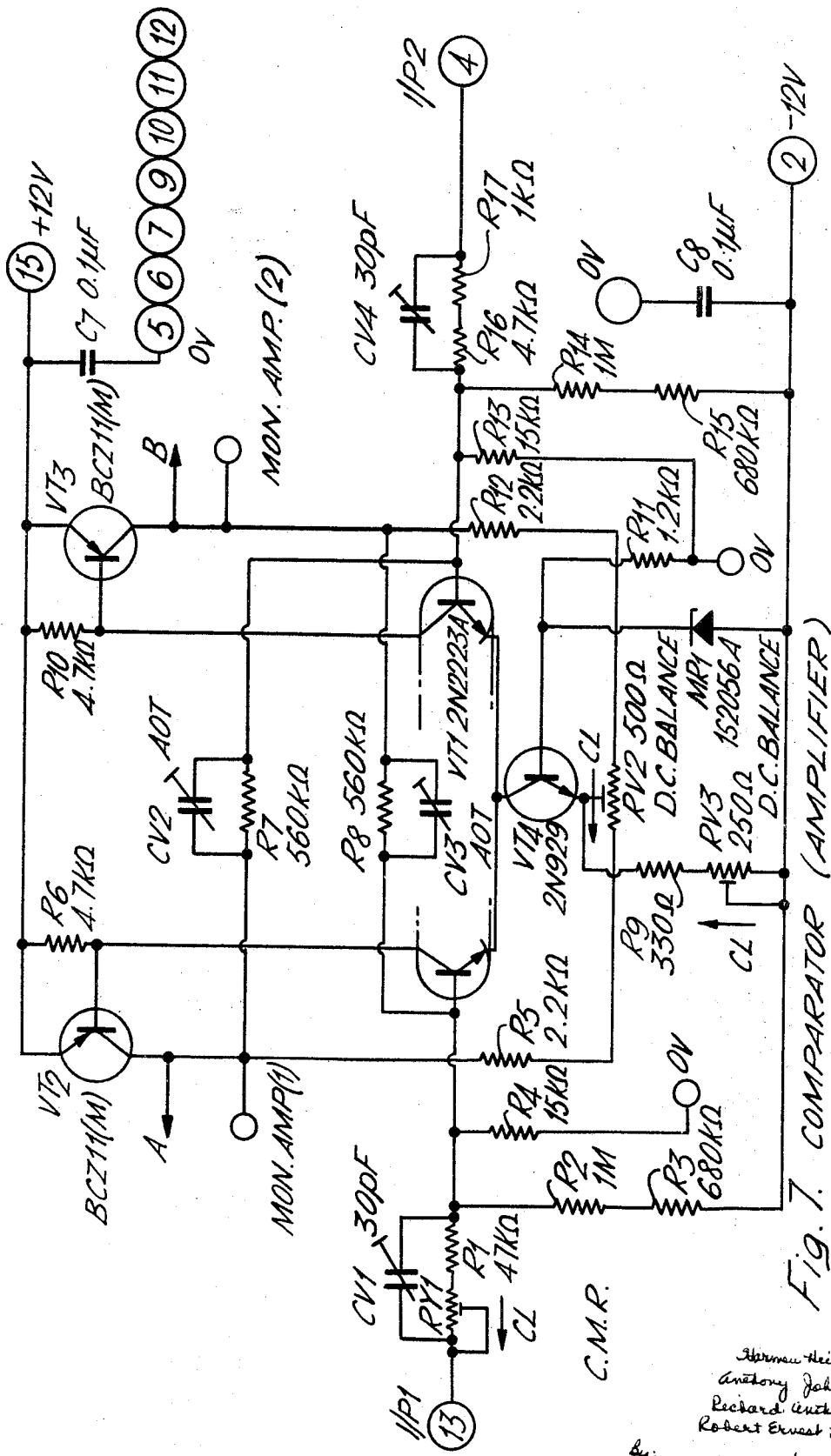
Fig. 7. COMPARATOR (AMPLIFIER)

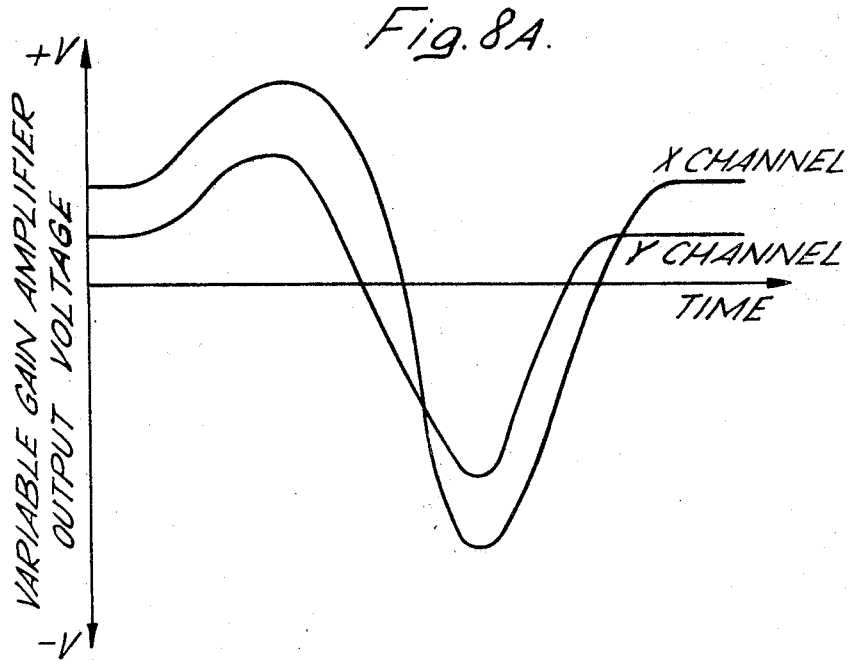
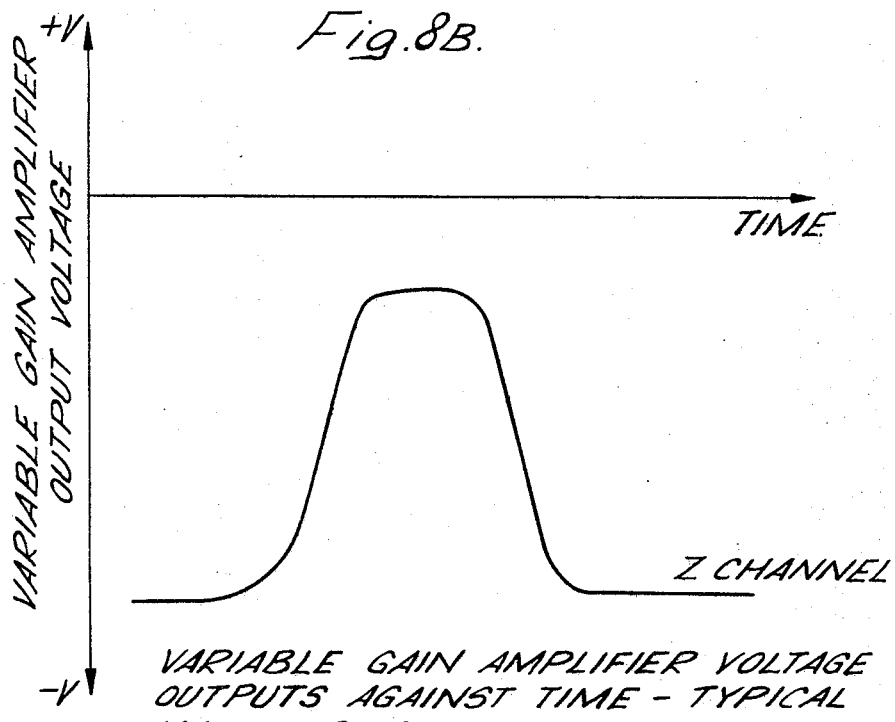
VARIABLE GAIN AMPLIFIER VOLTAGE
OUTPUTS AGAINST TIME – TYPICAL
WAVEFORMS

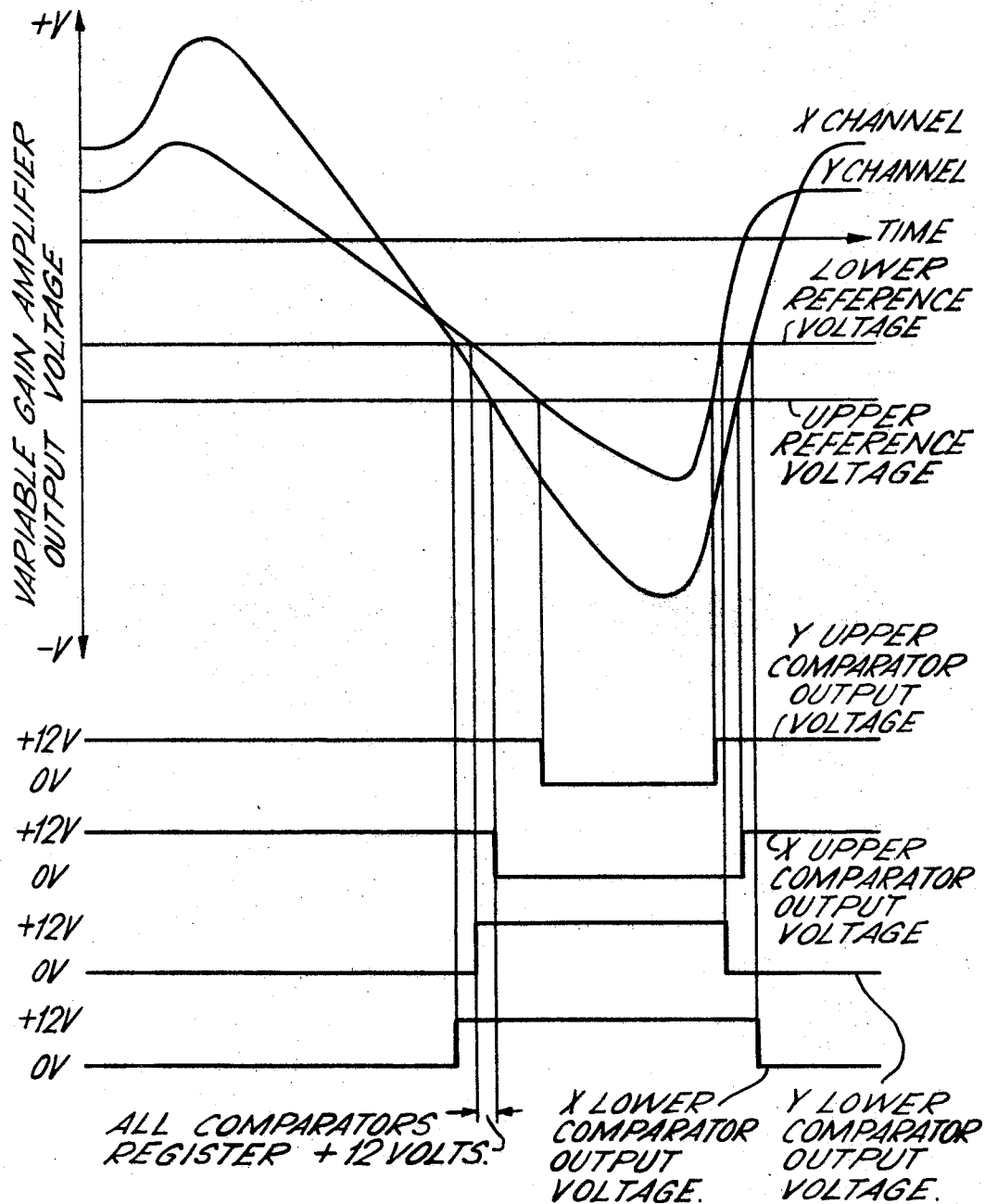
Fig. 9A. OPERATION OF X AND Y CHANNEL COMPARATORS.

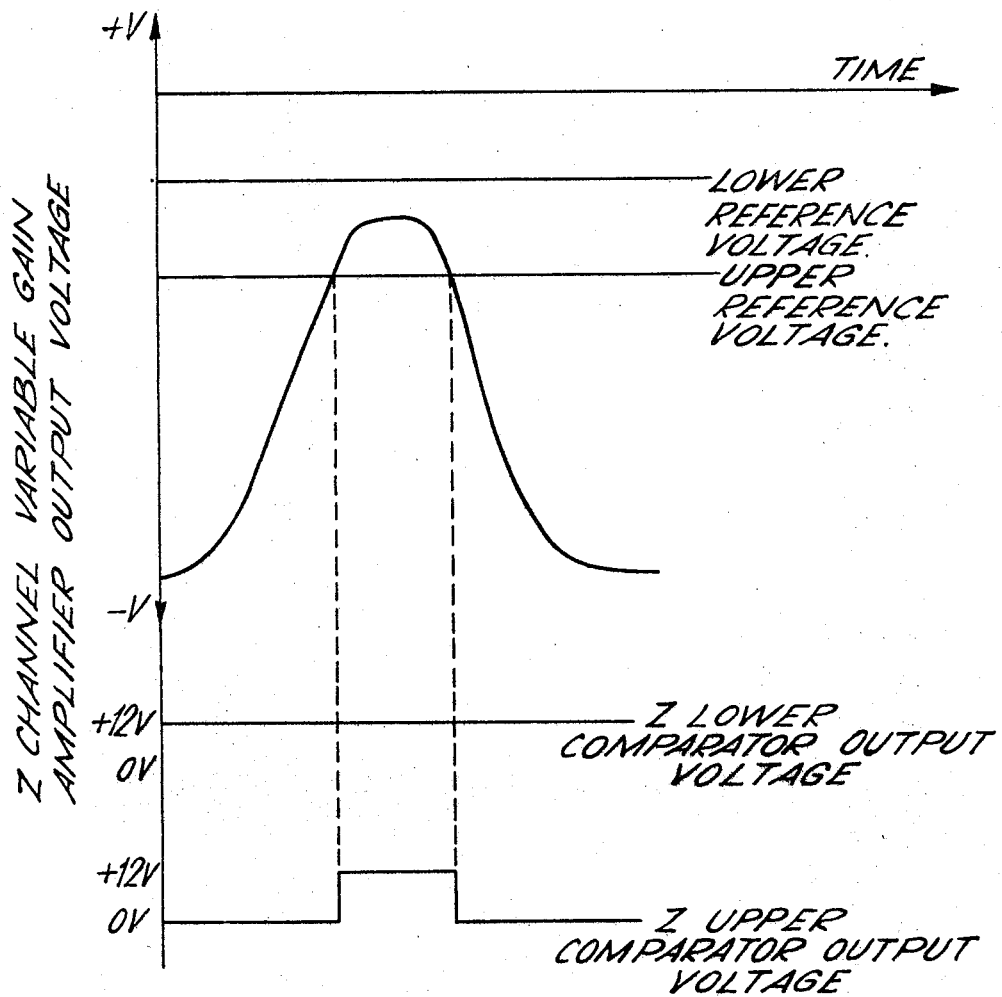
Fig. 9B. OPERATION OF THE Z CHANNEL COMPARATORS.
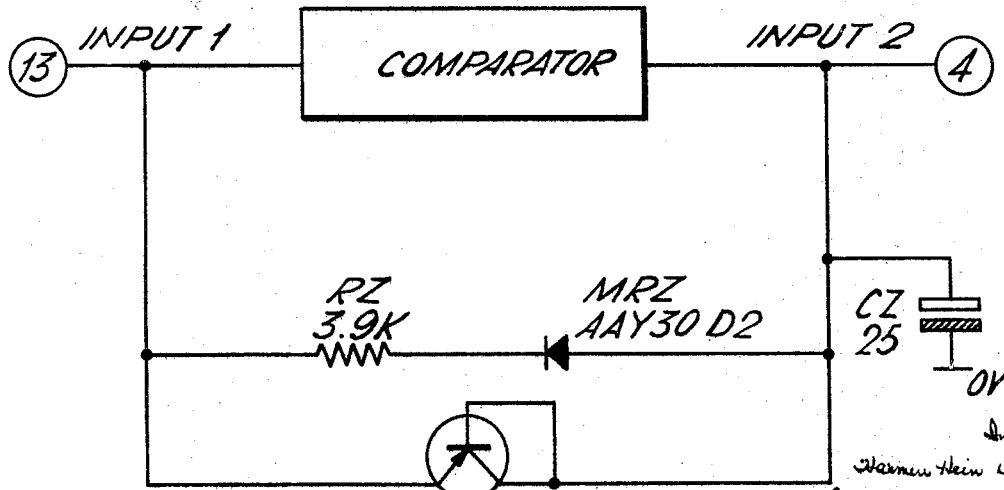
Fig. 10. Z WIDTH COMPARATOR.

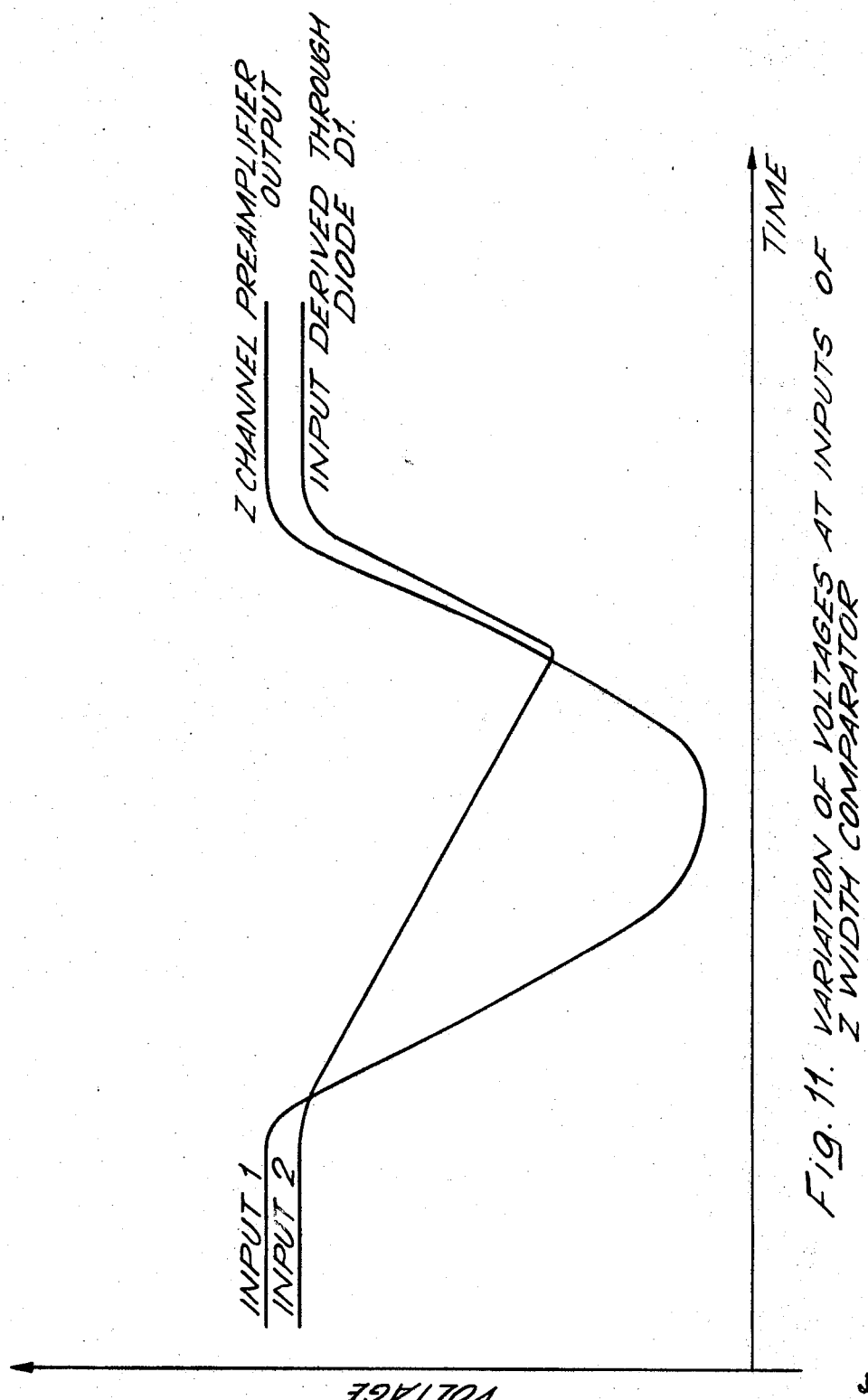

3,521,749
TECHNIQUES FOR DETECTING GEOMETRICAL DEFECTS IN REGULAR SHAPED FLAT OBJECTS
Harmen Hein Dijstelbergen, Stein, Netherlands, and Anthony John Allnutt, Richard Anthony Brook, and Robert Ernest Vickers Semos, Chislehurst, England, assignors to British Scientific Instrument Research Association, Chislehurst, England, a British company
Filed Apr. 24, 1967, Ser. No. 633,144
Claims priority, application Great Britain, Apr. 22, 1966, 17,820/66
Int. Cl. B07b 5/10
U.S. Cl. 209—82
9 Claims

ABSTRACT OF THE DISCLOSURE

Detecting of defects in coin blanks by positioning a blank between a light source and a photocell scribed into four quadrants, the light received by each quadrant providing a signal which is compared with a reference signal representing a blank of the desired dimensions.

---

This invention relates to the detection of defects geometrical in objects. In particular the invention relates to the detection of variations in the shape and surface area of an object from those of a reference object.

A large number of objects are produced by punching from sheet material. These punched objects may be end products such as washers or intermediate products, for example coin blanks. In either case geometrical defects are generally undesirable.

According to the invention there is provided apparatus for detecting geometrical defects in objects, said apparatus comprising detector means, a source of electromagnetic radiation arranged to illuminate the detector means, means for moving objects to be tested in succession between the source and detector means, said detector means comprising at least three elements, each element being adapted to provide a signal indicative of the radiation falling thereon and hence of the area of an object being tested obscuring that element, and means for processing signals from the elements to determine whether said object being tested has geometrical defects.

For any given object having an axis of symmetry, the equation of its periphery may be expressed as $$r = R_o + F(\phi)$$

where $r$ and $\phi$ are the polar coordinates about the axis of symmetry and $R_o$ is the radius of a circle of the same area as enclosed by the periphery. $F(\phi)$ can be developed as a Fourier series, $$F(\phi) = \sum_{k=1}^{\infty} a_k \sin(k\phi + \phi_k) \quad (1)$$

$$\alpha_k = \frac{1}{\pi} \int_0^{2\pi} F(\phi) \sin(k\phi) d\phi \quad (2)$$

$$\beta_k = \frac{1}{\pi} \int_0^{2\pi} F(\phi) \cos(k\phi) d\phi \quad (3)$$

$$a_k = (\alpha_k^2 + \beta_k^2)^{1/2} \quad (4)$$

If the object exhibits symmetry the lower terms in the series will be zero, for example for a rectangle $a_1 = 0$ and $a_{2k} = 0$ with $k$ an arbitary positive integer, for an equilateral triangle $a_1$ and $a_2$ and $a_{3k} = 0$ and for a square $a_1$, $a_2$, $a_3$ and $a_{2k} = 0$. If the periphery of the object defines a circle then all terms $a_k = 0$. On rotation about the axis of symmetry the pattern will be repeated with a frequency depending on the particular form of the object.

The present invention provides a method of detecting whether an object has at least one axis of symmetry comprising directing a beam of electromagnetic radiation onto said object such that the beam is substantially parallel to a supposed axis of symmetry of the object, detecting at least a part of the beam which is not interrupted by said object, said detecting being effected by detector means adapted to provide a number of signals greater than one, each signal being representative of a portion of the object acted upon by the radiation, and moving the beam, the object or the detector means with respect to the other two such that the object is rotated about said supposed axis of symmetry or such that said rotation of the object about said axis is simulated. Detectors need not always be positioned symmetrically and one detector is sufficient if a light wedge is turned as will be described.

In one embodiment of the invention the object to be tested is positioned on a transparent surface which is radially divided into sectors such that the axis of symmetry passes through the centre of the division in sectors. A beam of electromagnetic radiation, for example a beam of light having a larger cross sectional area than the object is directed onto the object. The light falling on each sector is detected and compared with the light falling on the other sectors. The number of sectors is preferably equal to the periodicity in the periphery of the object to be tested or such that the periodicity in the periphery of the object is a multiple of the number of sectors. On rotation of the object about the axis the amount of light received by each detector will be equal regardless of the angular position of the object, provided that the object is symmetrical.

It is often difficult to position automatically an object such that its axis of symmetry passes through the center of the division in sectors of the transparent surface and then rotate the object about the axis. Another embodiment of the invention therefore consists in moving the objects past series of detectors wherein each detector is displaced through a small angle with respect to the preceding detector. Provided the object is not rotated as it is moved the effect is that of rotation of the object about is axis of symmetry. If the object is symmetrical there will be an instant when the amount of light falling on each sector of a detector will be the same. It is evident that with this method the symmetry of the object will only be checked at discrete angles whereas with the previously described embodiment symmetry can be checked in all angular positions.

A further embodiment of the invention comprises directing a narrow wedge of electromagnetic radiation, such as light, onto the object to be tested, the object being positioned over a detector in the same way as described above. The wedge of light is then rotated about the axis of symmetry of the object. The signal derived from the detector as the light wedge rotates may be processed in several different ways in order to check the symmetry of the object. If only the AC parts of the signal are used the frequencies of the signal can be checked to see if they have predetermined values. Alternatively the signal can be compared with a standard signal.

Very often the symmetrical defect is in the form of a sharp corner on the periphery of the object. When the wedge of light is rotated around the axis of symmetry of the object such a sharp corner acts to produce an impulse of a frequency $w$. ($w$ is the frequency of rotation of the light wedge.) The spectrum of such a defective object will thus contain a range of frequencies $w$, $2w$, $3w$ ... $kw$, as can be seen from Equations 1 to 4 where $\phi = wf$. A symmetrical object will only give a limited number of these harmonics and therefore it is sufficient to look for one or two frequencies which should not occur in the signal in order to check the symmetry of an object. For example when checking regular $m$ sided objects with $m>4$ it is only necessary to look for the second and third harmonics.

Although reference has been made to the axis of symmetry of an object it is apparent that defective objects will not necessarily have an axis of symmetry. It is intended that, with defective objects, the axis about which rotation takes place is that axis which would be the axis of symmetry were the object not in fact defective. The invention is in fact most suited to detecting very small defects or errors of symmetry, where the object appears to the eye to have the desired shape.

Specific embodiments of the invention will now be described by way of example with reference to the accompanying drawings in which:

FIG. 1 shows diagrammatically the optical system employed in one embodiment of the invention;

FIGS. 3A and 3B are a block diagram of the circuit employed using a detector with four elements;

FIG. 4A shows a preamplifier circiut suitable for the X or Y channels of the circuit of FIG. 3;

FIG. 4B shows a preamplifier circuit suitable for the Z channel of the circuit of FIG. 3;

FIG. 5 shows a variable gain amplifier circuit suitable for the X, Y, and Z channels of the circuit of FIG. 3;

FIG. 6 shows the comparator trigger circuit;

FIG. 7 shows the comparator amplifier circuit;

FIG. 8A illustrates the waveforms from the X and Y channel variable gain amplifiers;

FIG. 8B illustrates the waveform from the Z channel variable gain amplifier;

FIG. 9A illustrates the operation of the X and Y channel comparators;

FIG. 9B illustrates the operation of the Z channel comparator;

FIG. 10 shows the Z width comparator circuit in more detail;

FIG. 11 illustrates the operation of the Z width comparator; and

Figure 2A:
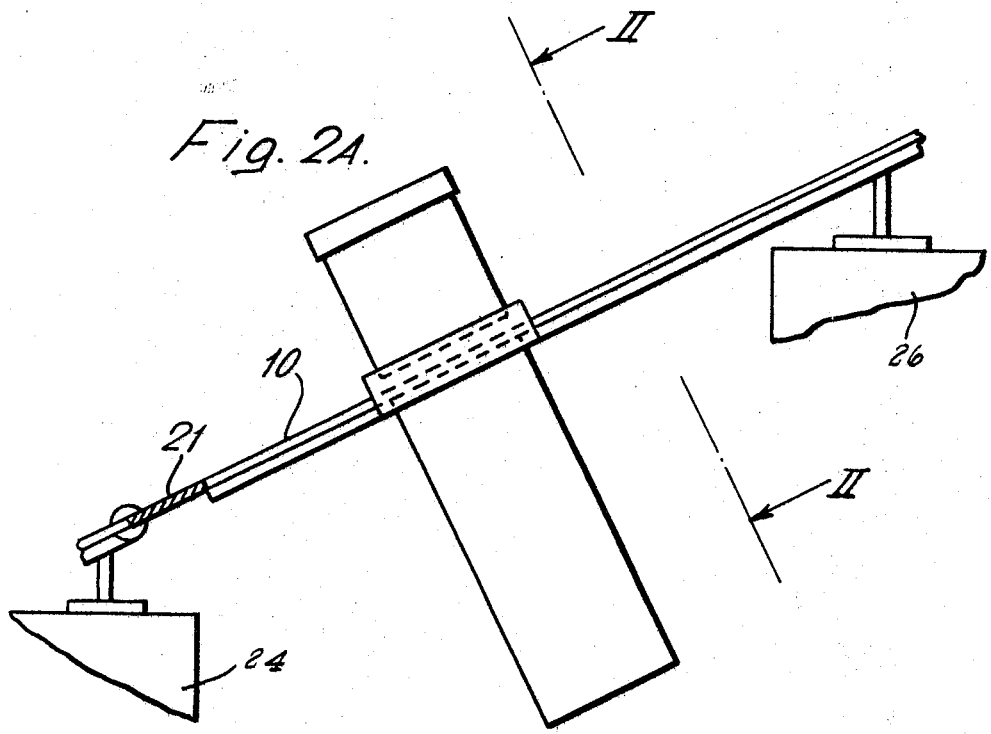
FIG. 2A is a side view of apparatus employing the optical system of FIG. 1.
Figure 2B:
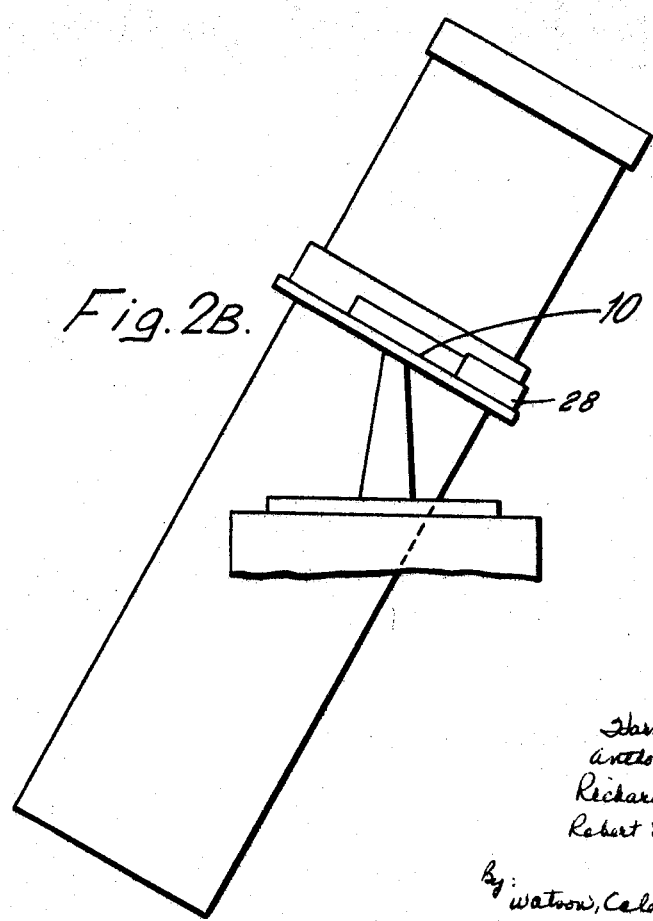
FIG. 2B is an end view of the apparatus of FIG. 2A.

Referring to FIGS. 1, 2A, and 2B the apparatus consists of a steel slide 10 and an optical system having three main components: a telescopic lamp housing containing the lamp 12 and condenser lens 14, a photocell housing containing a photocell 16, objective lens 18 and photocell connections 20, and a trapdoor assembly 21, set into the bottom of the slide.

Two rotary solenoids (not shown) control the trap door which is preferably made of nylon and is positioned approximately 10 cms. from the optical system. This spacing allows objects such as coin blanks up to crown size to be tested. A glass window 22 is set into the slide as shown in FIG. 1. The apparatus is supported by platform assemblies, 24 and 26, one at each end of the slide. These platform assemblies are adjustable so that the inclination of the slide, both longitudinally and transversely may be altered as described. The objects to be tested are constrained by a retaining rail 28 while passing down the slide. The rail, which is normally clamped to the slide, may be moved across the slide, perpendicular to its length, by means of two micrometer screws (not shown). This enables adjustments to be made so that the objects will pass over the glass window as close to the center thereof as possible.

As an object to be tested passes over the glass window in the slide, an image of it is focussed onto the photocell by means of the projection system. A typical light source is a Phillips 6 v., 15 w., Type 13347c filament lamp. The lamp is movable relative to the window in a direction perpendicular to the slide as by means of a telescopic adjustment in the housing (not shown). The condenser lens provides uniform illumination.

An image of the lamp filament is focussed through the glass window onto the objective lens beneath the slide. The objective lens focusses an image of the glass window, and hence a silhouette of any object that may be present over it onto the photocell beneath. The photocell may be a Ferranti type MS4B silicon photocell scribed into four quadrants producing the equivalent of four separate photocells each providing an independent signal. Both the objective lens and photocell are clamped to a rail (not shown) running parallel to the optical axis of the system, to provide for focussing adjustment for the system.

The optical axis is defined by the condenser lens and glass window which remain fixed relative to the slide. The objective lens is constrained by its mount to lie on the axis, but the lamp and photocell mounts are preferably provided with means of adjustment in directions, mutually perpendicular and at right angles to the axis so that the lamp and photocell may be accurately aligned with the other components of the system.

To attain optimum performance, the system is adjusted to provide uniform illumination of the aperture and clear image formation at the photosensitive surface with maximum possible transmission of light by the objective lens.

The electronic system associated with the apparatus will now be described. As shown in FIGS. 3A and 3B, the output from two adjacent quadrants 30, 32 of the photocell are fed to an X channel preamplifier 34 which produces an amplified difference between the signals of the two quadrants. Similarly adjacent quadrants 36, 38 have their outputs connected to a Y channel preamplifier which produces an amplified difference between the signals of the two quadrants. All four signals from the photocell are summed and fed to Z channel preamplifier 42. The output from each preamplifier 34, 40, 42 is fed into a variable gain amplifier 44, 46, 48 respectively. The voltage outputs against time during passage of an object past the photocell of the X and Y channel variable gain amplifiers are shown in FIG. 8A and that for the Z channel variable gain amplifier in FIG. 8B.

The output from each variable gain amplifier 44, 46, 48 is fed to two comparators 50 and 52, 54 and 56, 58 and 60 respectively. Each comparator has a reference voltage, supplied to it and each comparator output is in one of two states (in this embodiment 0 volts or +12 volts) dependent upon whether the input voltage is greater or less than the reference voltage. Thus the Z channel comparators 58, 60 have reference voltages supplied by Z lower and Z upper limit controls 62, 64 respectively. The peak voltage attained at the output of the Z channel variable gain amplifier when an object of the correct area is over the glass window is obtained by positioning a reference object over the glass window and measuring the output from the Z channel variable gain amplifier. The reference voltage from the Z lower limit control is adjusted to be slightly greater, i.e. less negative than this peak voltage, and the Z lower comparator set to give an output of +12 volts when the input voltage is less than the reference voltage and 0 volts when greater. Similarly the reference voltage from the Z upper limit control is adjusted to be slightly less i.e. more negative, than the peak voltage and the Z upper comparator is set to give an output of 0 volts when the input voltage is less than the reference voltage and +12 volts when greater. Thus when an object of correct area passes over the glass window the outputs of both Z upper and Z lower comparators will be +12 volts (FIG. 9B). If the area is too great the output of the Z lower comparator will be 0 volts instead of +12 volts and if the area is too small the output of the Z upper comparator will be 0 volts instead of +12 volts.

In the X and Y channels a common upper limit control 66 supplies the reference voltage to the X and Y upper comparators 52 and 56 respectively. Similarly a common lower limit control 68 supplies the reference voltage to the X and Y lower comparators 50 and 54 respectively. The X and Y channel comparators are set up in the same way as the Z channel comparators, adjustments being made so that the X and Y channel variable gain amplifiers 44, 46, register outputs of the same negative voltage with the control object of desired size and shape positioned on the glass window.

During the passage of an object which has no defects, at the instant it passes the position at which the control object was placed to set up the system, all X and Y comparators will give an output of +12 volts. This is illustrated in FIG. 9A. A defective object will distort the amplifier waveforms such that the X and Y comparator outputs could not all be +12 volts at the same time. The tolerance of the system is governed by the settings of the reference voltages i.e. the smaller the difference between the upper and lower reference voltages the closer will be the tolerance. It will be seen, that the X channel provides a check on whether the difference between the areas of an object covering quadrants 30 and 32 is at some time during the passage of the object the same as the corresponding difference obtained with the control object. Similarly the Y channel is a check on the difference between the areas of an object covering quadrants 36 and 38. The Z channel provides a check on the overall area of the object.

The apparatus does in fact provide a limited check on the symmetry of the object, the three channels in effect comparing the areas of three of the quadrants of the object with the area of its fourth quadrant together with preset values derived from the master blank. Since the objects are generally allowed to move down the slide in a random orientation and are not constrained as regards their angular disposition with respect to the photocell quadrants, the probability of a defective object being presented in a fashion as to appear symmetrical whilst at the same time having the correct area and hence failing to be rejected, is so small as to be negligible. Certain asymmetrical objects can also be examined for defects provided that their orientations with respect to the system are predetermined.

An object is taken to be acceptable if at some instant during its passage across the glass window all six comparators give an output of +12 volts. The six comparator outputs are fed to a gate 70 which produces a pulse if the object is acceptable. Gate 70 feeds a pair of bistable circuits 72, and 74 which control the trapdoor via solenoids such that the passage of a rejectable object opens the trapdoor if it is shut and such that the passage of an acceptable object closes it if it is already open.

Referring to FIG. 4A an amplifier circuit suitable for both the X and Y channel preamplifiers is shown. The amplifier is a standard operational amplifier known as a Burr-Brown 1514. The stage gain is determined by the ratio of the feed-back resistors R5 and R6 to the input resistors R9 and R10. Outputs of either polarity may be selected and the choice of output is purely arbitrary since the output polarity may be reversed by interchanging the inputs.

The amplifier is balanced for zero offset, i.e. zero output for zero inputs by adjustment of resistor RV1. The setting of variable resistor RV4 determines the amplitude ratio of the input signals and this provides a means of partially allowing for non-uniform sensitivity of the photocell and also facilitates setting up the apparatus to achieve optimum performance. If the amplifier is found to be oscillating the high frequency gain may be reduced by adjusting capacitors CV1 and CV2.

FIG. 4B shows the Z channel preamplifier in more detail. The operational amplifier—a Nexus SA-1—is balanced for zero offset by adjustment of resistor RV3, capacitor CV5 being used to reduce high frequency gain. DC balance of the four input signals is obtained by making the parallel combination of resistors R18 and R19 equal to the parallel combination of input resistors R14, R15, R16 and R17. If desired the three preamplifiers may be constructed as a module, the outputs therefrom being connected to sockets on a panel.

A circuit for the three identical variable Gain Amplifiers is given in FIG. 5. The gain of this stage is controlled by variable resistor RV10 and may be varied between one and five. This control is in a feedback loop around a Nexus FSL-6 Operational Amplifier. The bandwidth of the stage is limited by capacitor C20, in another feedback loop, and any further reduction of the bandwidth can be obtained by increasing the value of capacitor C10. The output voltages are limited by resistors R26–31 and the diodes D2 and D3 to prevent saturation of the operational amplifier; latch up is prevented by diode D1.

The outputs may be connected to monitor sockets on the front panel of the variable Gain Amplifier Module.

A circuit diagram for the comparators is given in FIGS. 6 and 7. Each comparator has two inputs and two outputs, the output voltages being +12 volts and 0 volt.

Each channel uses two comparators. One designated Upper and the other Lower. In each case the output from the variable gain amplifier is fed to input 1 of both the Upper and Lower Comparators. Input 2 is maintained at a DC reference voltage by a limit control. A modified comparator is used to detect the presence of objects over the glass window. It is called the "Z width Comparator," and is used to gate the logic circuitry and details of the modification are given in FIG. 10.

Input 1 is fed directly from the output from the Z channel preamplifier and the DC reference voltage applied to input 2 is derived from input 1 through diode D1. In the quiescent state the capacitor CZ charges through D1 and input 2 reaches a voltage lower than that at input 1 by the forward voltage dropped across the diode.

As an object passes over the glass window the output of the Z channel preamplifier falls to a minimum and then returns to the quiescent level. As input 1 falls below input 2 the comparator outputs change state, returning to the original sate as input 1 arises above input 2 again.

It is desired that the equipment should be able to detect and reject any small stray fragments passing through the system with the objects. During their passage over the glass window such fragments produce small disturbances in the output from the Z channel preamplifier. These disturbances are only detectable if their amplitudes exceed the difference in voltage between input 1 and input 2; i.e. the voltage drop across D1.

Thus it is necessary to maintain the smallest possible voltage drop across D1 consistent with the prevention of spurious triggering of the comparator.

The diode D1 automatically provides a small fixed potential difference between input 1 and input 2 in the quiescent state which is independent of the quiescent level at input 1. To prevent the diode maintaining this difference during the passage of an object the capacitor C is provided. This capacitor must be sufficiently large to prevent the level at input 2 from falling significantly until the level at input 1 has fallen below it, even during the passage of the smallest, slowest moving fragments.

RZ is chosen to be much smaller than the input impedance of input 2 and when the voltage at input 1 falls below that at input 2, D2 becomes forward biased allowing the capacitor to discharge more quickly into the low output impedance of the preamplifier. The voltage at input 2 then falls to meet the rising voltage at input 1 as the object leaves the glass window. This facility is designed to speed up operation of the equipment, since the recognition of defective objects takes place when the comparator reverts to its original state. On reversion the capacitor again charges through D1, rapidly following the rising voltage at input 1. The variation of the voltages at the inputs of the Z width comparator during the passage of an object is shown in FIG. 11.

Whilst an object is over the window this comparator, therefore, registers a high output. The changes in output state from the comparator as the blanks enter and leave the inspection area are used to initiate and terminate the analysis of waveforms via the bistable circuits 72 and 74. The circuit is designed to detect small changes in the Z channel waveform so that small stray objects such as nuts, bolts, and washers, may be detected as they pass down the chute and rejected as defective items.

Figure 12:
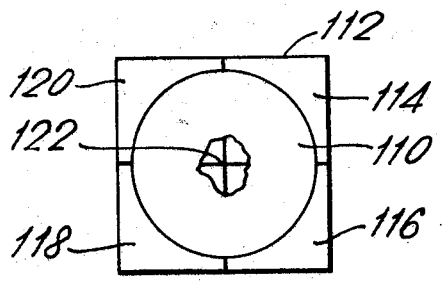
FIGS. 12 to 14 show diagrammatically three further embodiments of the invention.

Referring to FIG. 12 an object 110 is positioned on a transparent surface 112 which is divided into four sectors 114, 116, 118 and 120. The supposed axis of symmetry of the object is arranged to pass through the centre 122 of the transparent surface shown in the cut away portion of the object. A uniform beam of light is directed onto the object parallel to the axis and the light falling on each sector is detected. The object is then rotated about the axis and if the amount of light detected in each sector is the same the object is symmetrical. The beam of light may be radially symmetrical instead of uniform.

Figure 13:
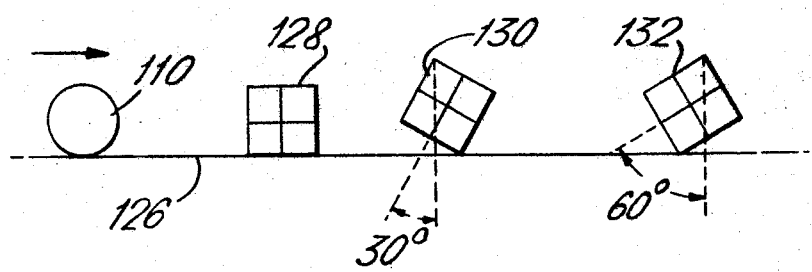

FIG. 13 illustrates an object to be tested 110 positioned on a surface 126. The coefficient of friction between the surface and the object is low so that when the object is moved in the direction of the arrow, it will not rotate. The object is moved past the detectors 128, 130 and 132, detector 130 being displaced through an angle of 30° with respect to detector 128 and detector 132 being displaced through an angle of 60° with respect to detector 128. The optimum value of the angle between detectors will vary with the shape of the object being examined. Uniform or radially symmetrical light beams directed on each of the detectors which are divided into sectors in much the same way as the arrangement shown in FIG. 12. The surface and the detectors are arranged such that as the object passes the detectors its supposed axis of symmetry passes through the centre of the division into sectors. At this instant the amount of light falling on each sector will be the same if the object is symmetrical.

The signals derived from the detectors in the embodiments of FIGS. 12 and 13 may be processed in any suitable way. One method of comparing two signals is to make use of a circuit having two possible output states arranged to give one output when one signal is higher than the other and the other output when the situation is reversed.

A device which detects whether one signal is larger than another can be used to detect equality of the signals by adding a periodic signal to one of the inputs. When the two input signals are the same the output will contain a component with a frequency of the imposed periodic signal. Thus whenever signals of this frequency occur in the output the input signals are considered to be equal. The amplitude of the periodic signals governs the tolerance with which the two input signals have to be equal to give this output.

Figure 14:
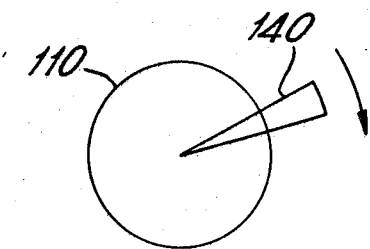

The above described devices may not necessarily detect an object which has been damaged in such a way that it is still symmetrical. However with the arrangement shown in FIG. 14 this drawback is removed. As shown in FIG. 14 a wedge of light 140 is directed onto an object 110 and rotated about the supposed axis of symmetry of the object. A detector (not shown) such as a photocell is positioned behind the object and receives that portion of the wedge of light which is not interrupted by the object.

As mentioned previously the signals derived from the detector can be processed in any suitable way to check whether the object is symmetrical or not. An inspection of the frequencies which should not occur in the signals, as described above will detect an object which has been damaged symmetrically.

What we claim is:
1. Apparatus for detecting geometrical defects in objects, said apparatus comprising detector means, a source of electromagnetic radiation arranged to illuminate the detector means, means for moving objects to be tested in succession through a fixed predetermined position between the source and the detector means, said detector means comprising at least three elements, each element being adapted to receive a different sequent of said radiation passing through said predetermined position and to provide a signal indicative of the radiation falling thereon, the sum of the signals from said elements being representative of the area of an object being tested at said predetermined position, and means for processing signals from the elements to determine whether said object being tested has geometrical defects.

2. Apparatus as claimed in claim 1, wherein means are provided for comparing the signals from the detector when an object to be tested is disposed between the source and the detector.

3. Apparatus as claimed in claim 2, wherein means are provided for adding the signals derived from the detector when an object is disposed between the source and the detector to provide a signal representative of the cross-sectional area of the object, comparison means being also provided for comparing the added signals with a signal representative of the desired cross-sectional area.

4. Apparatus as claimed in claim 3, wherein the detector comprises an even number of detector elements.

5. Apparatus as claimed in claim 4, wherein the comparison means comprises a plurality of difference amplifiers each difference amplifier being responsive to signals from two elements.

6. Apparatus as claimed in claim 5, wherein the comparison means further comprises means for comparing the output signal from each difference amplifier with a signal representing the desired output signal.

7. Apparatus as claimed in claim 6, wherein means are provided for separating the defective objects from a succession of objects being tested, said separating means being responsive to signals from the comparison means.

8. Apparatus as claimed in claim 7, wherein the separating means comprises a chute for conveying the objects which have been tested, a trapdoor provided in said chute responsive to signals from the comparison means.

9. A method of detecting whether an object has at least one axis of symmetry comprising directing a beam of electromagnetic radiation onto said object such that the beam is substantially parallel to a supported axis of symmetry of the object, detecting at least a part of the beam which is not interrupted by said object, said detecting being effected by detector means adapted to provide a number of signals greater than one, each signal being representative of a portion of the object acted upon by the radiation, and moving the beam, the object or the detector means with respect to the other two such that the object is rotated about said supposed axis of symmetry or such that rotation of the object about said axis is simulated.

References Cited

UNITED STATES PATENTS

| | | | |
|---|---|---|---|
| 2,346,031 | 4/1944 | Jones et al. | 356—158 |
| 2,447,024 | 8/1948 | Metcalf | 356—158 |
| 3,280,692 | 10/1966 | Milnes et al. | 356—158 |
| 3,312,140 | 4/1967 | Dokoupil | 356—158 |
| 2,916,633 | 12/1959 | Stone et al. | 250—223 |
| 3,060,791 | 10/1962 | Honnoch | 209—82 X |
| 3,102,960 | 9/1963 | Sick | 250—220 |
| 3,226,555 | 12/1965 | Miller | 250—223 |
| 3,395,794 | 8/1968 | Petry | 209—82 X |

ALLEN N. KNOWLES, Primary Examiner

U.S. Cl. X.R.

209—111.7; 356—158